Aug. 17, 1954  A. W. PAYNE  2,686,350
POWER-OPERATED SAW
Filed Sept. 28, 1951  4 Sheets-Sheet 1

INVENTOR.
ARTHUR W. PAYNE
BY
Barnes, Kisselle, Laughlin & Raisch
ATTORNEYS.

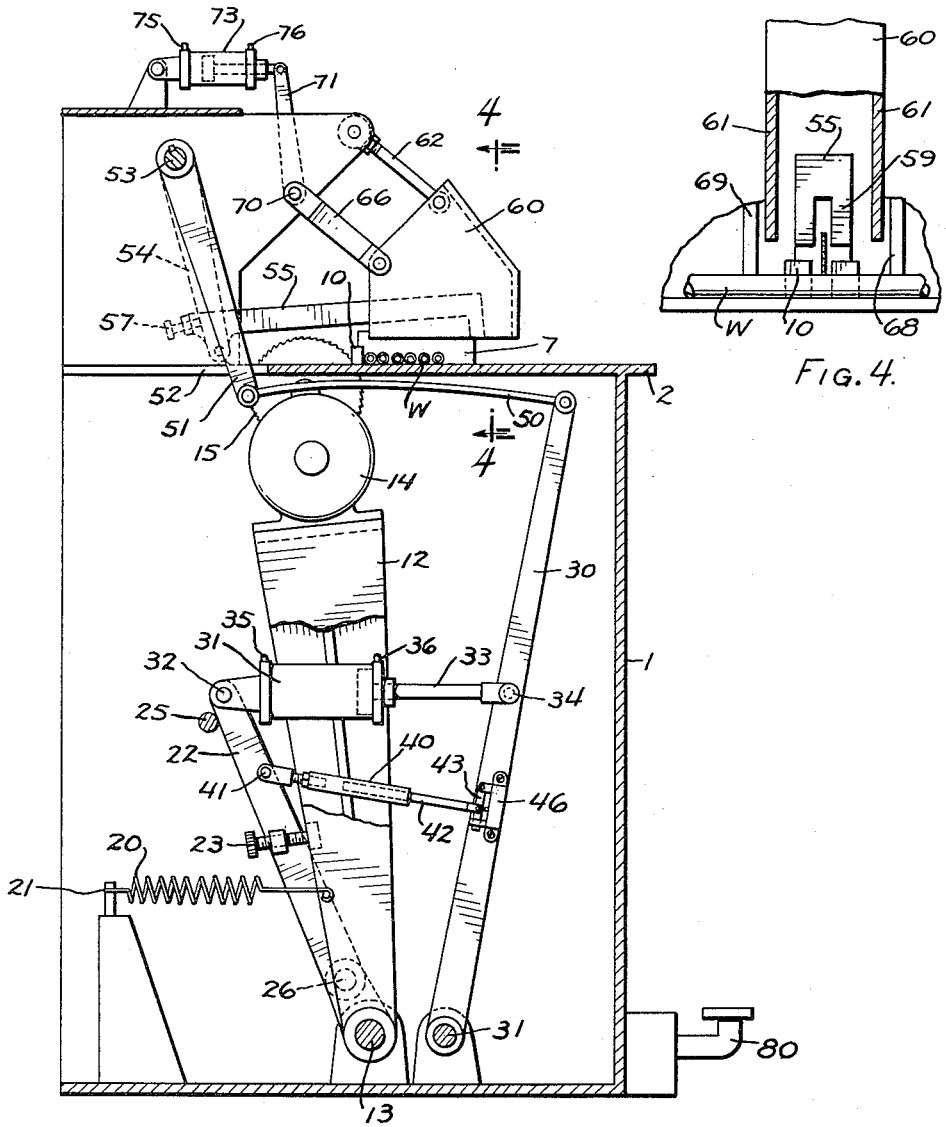

Aug. 17, 1954   A. W. PAYNE   2,686,350
POWER-OPERATED SAW
Filed Sept. 28, 1951   4 Sheets-Sheet 3

INVENTOR.
ARTHUR W. PAYNE
BY
Barnes, Kisselle, Laughlin & Raisch
ATTORNEYS.

INVENTOR.
ARTHUR W. PAYNE

Patented Aug. 17, 1954

2,686,350

UNITED STATES PATENT OFFICE 2,686,350

POWER-OPERATED SAW

Arthur W. Payne, Detroit, Mich., assignor to Bundy Tubing Company, Detroit, Mich., a corporation of Michigan Application September 28, 1951, Serial No. 248,688

6 Claims. (Cl. 29—69)

This invention relates to a power operated cutting device for cutting work pieces, wherein the cutting device is moved by power relative to one or more work pieces so that the cutting device traverses and cuts the work pieces.

The invention may be exemplified in a sawing device which has a power driven rotary saw disc. In accordance with the invention the saw disc is mounted for movement so that it may be moved by power and caused to take a cutting stroke relative to work placed in position to be cut. An object of the invention is to provide a mechanism wherein the powered cutting stroke of the saw disc automatically varies with the requirements of the work. If work, which is placed in position, requires only a short cutting stroke in order for the saw disc to pass therethrough, then the disc is given a relatively short stroke; if the work requires a longer stroke, then the mechanism automatically imparts a longer cutting stroke to the saw disc.

Other objects of the invention include the provision of a mechanism which embodies inherent safety features. In this connection, even though the powered mechanism is caused to operate through a cycle of movement with no work in position to be cut, the mechanism will go through the cycle of movement, but the saw disc will not move. In other words, work is required to be present in position to be cut before there is a cutting stroke of the saw disc. Further objects include saw mechanism for making good square cuts and capable of making repeated operations in production at a relatively high rate. A mechanism constructed in accordance with the invention is capable of a simple control and a proper timing of the movements of the various elements is inherently present.

The saw mechanism of the present invention may be used for sawing various materials, such as metal, wood, synthetic materials, and the like. An example of the work is tubing which may be cut to size. The tubing may vary in diameter and one length or a plurality of lengths of tubing may be placed in position to be sawed during one cycle of movement of the mechanism.

A power operated saw mechanism made in accordance with the invention is shown in the accompanying drawings.

Fig. 3 is a view taken substantially on line 3—3 of Fig. 1 with some parts cut away and some parts in section illustrating the construction with work tubes placed in position to be sawed.

Fig. 4 is an enlarged sectional view taken substantially on line 4—4 of Fig. 3.

Figures 1, 2, 9:
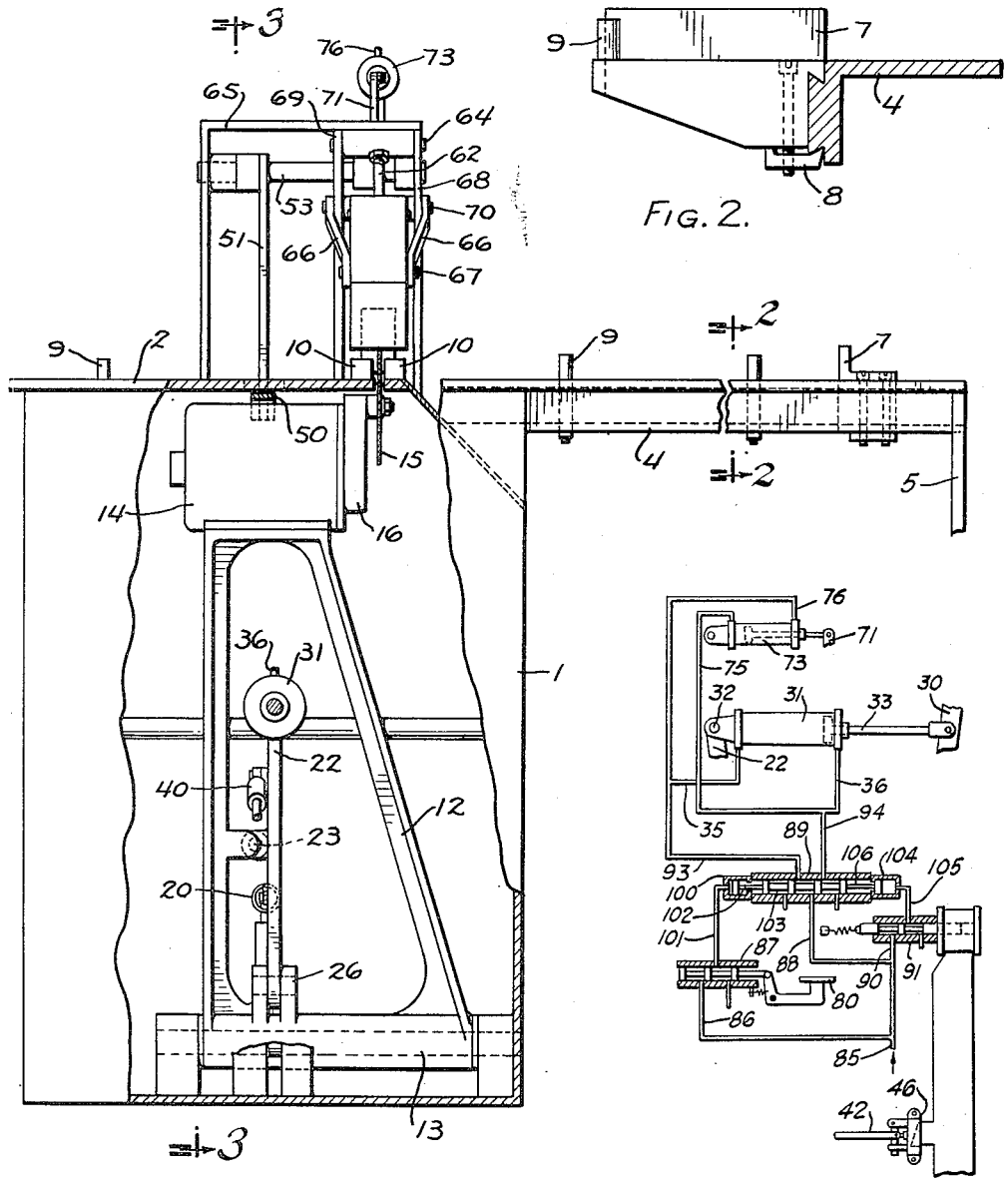
Fig. 1 is a front elevational view with some parts cut away and some parts in section showing the support, the saw and its driving motor, and some of the ancillary features of construction.
Fig. 2 is a cross sectional view taken substantially on line 2—2 of Fig. 1 showing a stop.
Fig. 9 is a diagrammatic view of a compressed air system for operating the mechanism.

The construction as illustrated in Figs. 1 and 3 embodies a suitable support or table 1 having a table top member 2 for receiving the work. The work is shown as in the form of a plurality of tubes W in Fig. 3. The table may have an extension 4 supported by a leg 5 and it may be provided with an end stop 7 mounted in an adjustable manner, as by means of a clamp 8, as illustrated in Fig. 2. The work piece or pieces may be positioned as shown in Fig. 3 and their leading ends may be advanced against the stop 7 to thus determine the length. Several guide posts 9 upstanding from the surface member 2 may aid in positioning the work laterally, and immediately adjacent the saw, as will presently appear, may be abutments 10.

There is an arm 12 which may be in the form of a frame pivotally mounted in the lower part of the table as at 13 and this frame carries a motor 14 which drives the rotary saw disc 15 advantageously through gearing in a gear box 16. The table top is slotted as at 17 so that the saw disc may pass therethrough.

A spring 20, anchored as at 21, acts upon the arm 12 to normally hold the saw retracted in inoperative position, as shown in Fig. 3. A second arm 22 is provided with an adjusting abutment screw 23 against which the arm 12 abuts, and the spring holds the arm 22 against the stop 25. The arm 22 is pivotally mounted as at 26. Another arm or lever 30 is pivotally mounted as at 31 and connected between the arms 22 and 30 is the motor for causing the power stroke of the saw. Preferably this is an air operated motor having a cylinder 31 connected to the arm 22 as at 32 while a piston in the cylinder has its piston rod 33 connected to the lever 30 as at 34. Air under pressure may be introduced into either end of the cylinder and exhausted from the opposite end thereof through conduits 35 and 36.

Figure 6:
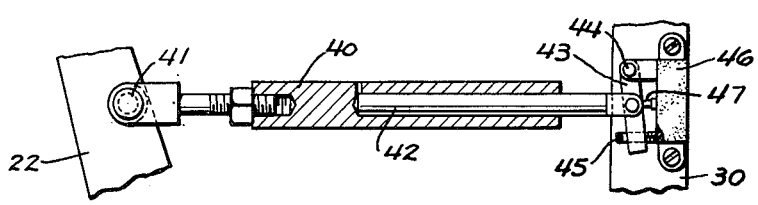
Fig. 6 is a detailed view partly in section showing a reversing switch and the operating mechanism therefor.

Also interconnecting the arm 22 and lever 30 is a means for determining the operating range of movement or stroke of the cylinder and piston and for reversing the action thereof. A member 40 (Fig. 6) is connected to the arm 22, as at 41, and a rod 42 is telescopingly arranged with the member 40. One end of this rod is carried by a link 43 pivotally mounted on the arm 30 as at 44. The link may be guided in its movement by a guide 45. There is an electric switch 46 carried by the lever 30 having an actuating element 47.

Figure 7:
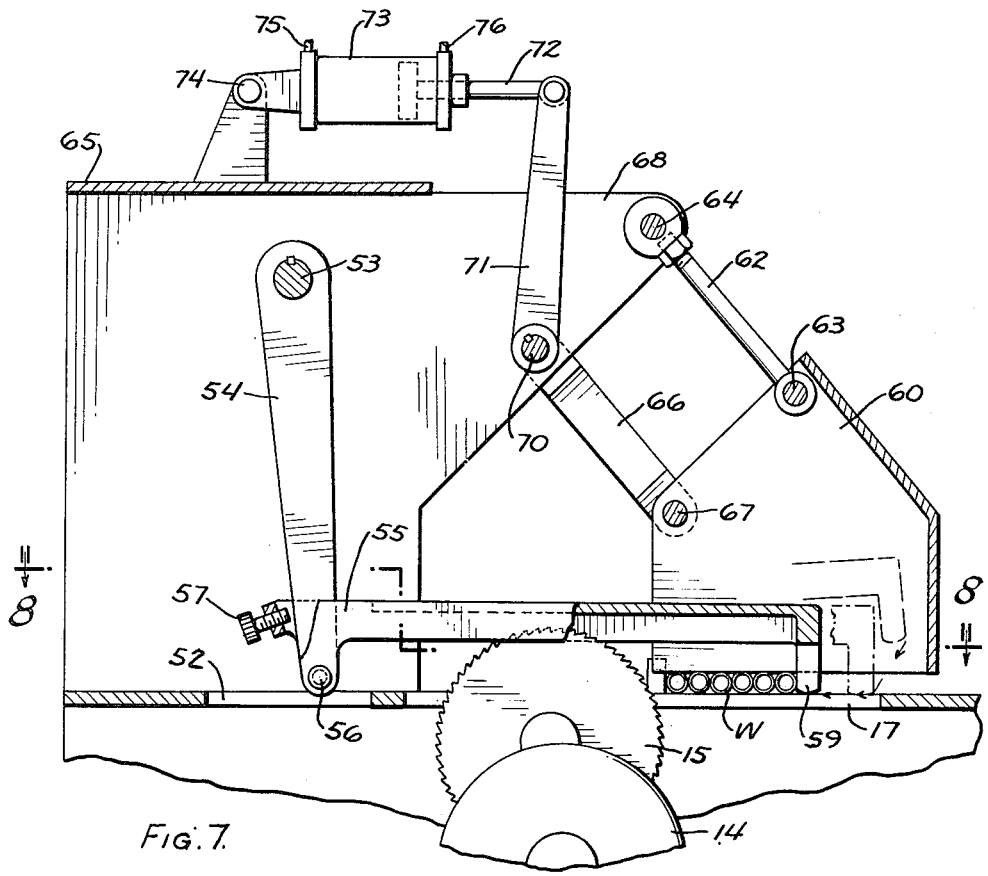
Fig. 7 is an enlarged view with some parts shown in section illustrating the position of the parts at substantially the beginning of the cutting stroke of the saw.
Figure 8:
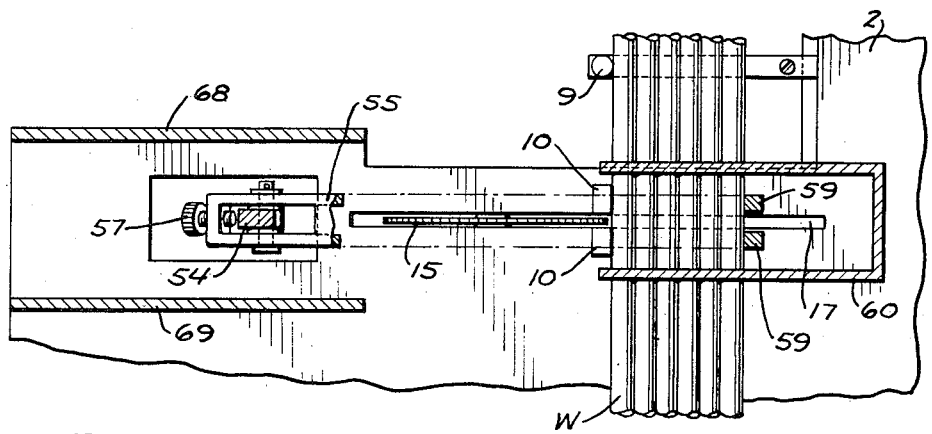
Fig. 8 is a view largely in section taken substantially on line 8—8 of Fig. 7.

The lever 30 is for the purpose of operating what may be termed a "clamp" for clamping the work. For this purpose, a rod 50 connects the upper end of the lever 30 to an arm 51 which extends through a slot 52 in the table. This arm 51 is keyed to a shaft 53, and keyed to the shaft 53 is a lever 54 (Fig. 7). The shaft 53 is mounted in the supporting structure 65. A clamp member 55 is pivotally mounted on the lever 54 as at 56 and this clamp has an adjustable thrust screw 57 positioned to engage the lever 54. The clamp member 55 is of bifurcated construction (Fig. 8), and it has a downwardly extending bifurcated tubing engaging part 59. The clamp 55 extends from what may be normally termed the rear of the saw blade to the front thereof, as shown in Figs. 3 and 7.

There is a guard which may also be employed as a hold-down for the work and it comprises a member 60 with opposite and spaced walls or panels 61 (Fig. 4). This guard is mounted by a link 62 pivoted to the guard as at 63 and pivoted as at 64 between plates 68 and 69 of the supporting member 65.

Also connected to the guard 60 are links 66 pivoted to the guard as at 67 and keyed to a cross shaft 70 which, in turn, has keyed thereto a lever 71. This is an actuating structure, the arm 66 and the arm 71 constituting, in effect, a form of bell crank lever, and the arm 71 is connected to a piston rod 72 of a piston in a cylinder 73, one end of which is pivotally mounted as at 74. A hydraulic medium or compresed air may be introduced and discharged from ends of the cylinder 73 through conduits 75 and 76. The links 62 and 66 may form a parallelogram.

A single control means may be employed for operating the mechanism and this may take the form of a foot lever 80 to be tripped by the foot of the operator.

The system shown in Fig. 9 illustrates diagrammatically a compressed air system which may be employed to operate the mechanism. A conduit 85 for supplying compressed air has a branch 86 which leads to a 3-way valve 87 operable by the foot pedal 80, a branch 88 which extends to a 4-way control valve 89, and a branch 90 which extends to a 3-way valve 91 operable by a solenoid connected through switch 46. A conduit 93 extends from the 4-way valve and connects into the lines 35 and 76. A conduit 94 connects into lines 36 and 75. Means for operating the 4-way valve resides in a cylinder 100 connected to the 3-way valve 87 by a line 101 and a piston in the cylinder 100 which has a rod or projection 102 for engaging the valve member 103 of the 4-way valve 89. Another cylinder 104 connected to the 3-way valve 91 by a line 105 has a piston therein with a piston rod 106 engaging the valve member 103. The valves have exhausts as shown.

The position illustrated is the at rest position with air under pressure delivered to the cylinder 73 through line 76 and to cylinder 31 through line 35. When the foot pedal is depressed momentarily, air under pressure is passed to cylinder 100 and the 4-way valve member 103 is shifted to the right. This connects the pressure line 88 to the line 94 and connects the line 93 to exhaust. Thus air under pressure enters the cylinders 73 and 31 through lines 75 and 36 and the pistons therein are caused to move for the purposes already described. At the end of the stroke of the saw, the rod 42 actuates the switch member 47 to close the circuit and actuate valve 91 for momentarily connecting line 105 to the pressure line 90 and the piston in the cylinder 104 pushes the valve member 103 back to the position shown in Fig. 9. This exhausts the cylinders 73 and 31 through the line 94 and causes air under pressure to be introduced therein through line 93 so that the parts of the mechanism move back to the position as shown in Fig. 3. The system will remain in this condition until the pedal 80 is again tripped.

In the operation of the apparatus, it will be understood that the motor 14 is operating and that the saw disc is rotating. In the normal at rest position, the parts are in the position shown in Fig. 3. The operator positions himself to the right hand side of the structure shown in Fig. 3, which may be considered the front side. At this time, air under pressure is in the cylinder 31, the same being introduced through the conduit 35 and the opposite end of the cylinder is exhausted. Thus, the compressed air holds the lever 30 in its right hand position, as shown in Fig. 3, and holds the lever 22 against the stop 25. The spring 20 holds the arm 12 against the stop screw 23 with the saw disc to the rear of the stops 10. Also, air is supplied to the cylinder 73 through the conduit 76 and the bell crank action of levers 71—76 raises the guard 60. With the lever 30 held outwardly to the right, as Fig. 3 is viewed, the lever arms 51 and 54 are held in the position shown in Fig. 3, and the clamp 55 is held elevated from the table 2 by the engagement of the screw 57 with the lever 54.

The operator now positions one or more work pieces. For example, a single tube or a plurality of tubes may be advanced with their leading ends positioned by the stop 7 and with the work positioned against the stops 10. The operator now trips the lever 80 and air is introduced into the cylinder 31 through the conduit 36 and air is exhausted through conduit 35. Also, air is introduced into the cylinder 73 through the conduit 75 and exhausted through conduit 76. This rocks the bell crank lever structure 71—76 clockwise about the pivot 70 and lowers the guard 60 to the position shown in Figs. 5 and 7. The guard thus covers the saw and prevents damage to the hands of the operator. It may also engage and hold the work pieces down upon the table top 2.

Figure 5:
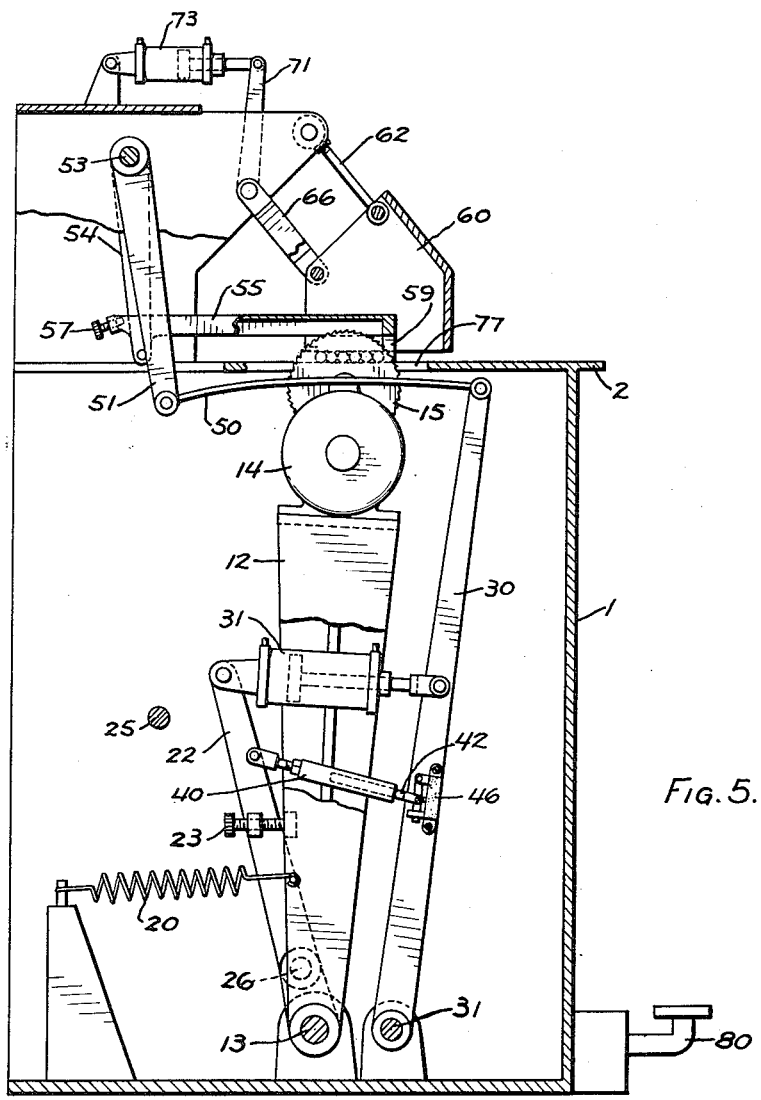
Fig. 5 is a view similar to Fig. 3 showing the position of the parts substantially at the completion of a cutting stroke.

The air introduced into the cylinder 31 through inlet conduit 36 causes relative movement of the piston and cylinder. At this moment, the reaction point 32 remains stationary because of the spring 20. As the arm 30 moves counter-clockwise, as Fig. 3 is viewed, the lever arms 51 and 54 swing counter-clockwise about the axis of the shaft 53. In this movement the clamp 55 is lowered by gravity until the clamp portions 59 rest upon the table top. This is illustrated by the arrows in Fig. 7. Continued movement of the lever 30 counter-clockwise causes the clamp 55 to shift to the left as Fig. 3 is viewed, and the clamping portions 59 engage the forwardmost work piece and this movement continues until the work, which may be one piece or several pieces, are clamped against the stops 10. When this occurs, further movement of the arm 30 counter-clockwise is arrested. Thereupon, with continued application of air under pressure into the cylinder 31 through inlet conduit 36, the arm 22 is moved clockwise as Fig. 3 is viewed. This, through the means of the thrust screw 23 swings the saw supporting lever 12 clockwise, as shown in Fig. 5, and causes the saw to cut through the work. The reaction point 34 on lever 30 remains stationary. The parts are now in the position shown in Fig. 5.

In the counter-clockwise movement of the lever 30 and the clockwise movement of the lever 22, the rod 42 is telescoping into the member 40 and when the rod bottoms in the member 40, which occurs as the saw supporting arm 12 is swinging clockwise, the switch actuator 47 is depressed. This causes the control valve member 103 to be shifted back to the Fig. 9 position with the result that air is now exhausted from the cylinder 31 through conduit 36 and charged into the cylinder 31 through the conduit 35 and air in cylinder 73 is exhausted through line 94 and charged into the cylinder through line 93. This causes a reversal of movement and the parts move back from the Fig. 5 position to the Fig. 3 position. The severed work pieces may now be removed and other portions and other work pieces properly located, as above described, and again the operator may depress the lever 80, reversing the condition of the air as supplied to cylinder 31 and cylinder 73 for a second cycle of movement.

Now it will be observed that if a large number of tubes are placed in position to be sawed, within, of course, the limits of the machine, there is very little angular movement of the arm 30 until the work is engaged by the clamp elements 59 and clamped against the stops 10. This is followed by a relatively great angular movement of the saw disc. On the other hand, suppose only a single tube of the size shown in the drawings is placed in position to be cut; then, the arm 30 operates through a relatively great angular movement until the single tube is clamped, at which time the saw begins to move, but it moves only the remaining short distance enough to cut through the single tube whereupon the air is reversed by the controlling switch 46. Suppose, for example, the operator trips the foot pedal 80 and there is no work in position to be cut; under this condition, the arm 30 will move the complete distance from the Fig. 3 position to the position where the switch 46 is actuated to reverse the air and move the arm back to its at rest position, as shown in Fig. 3, with no movement of the saw at all.

The situation may be viewed as involving a maximum amount of relative movement between the saw supporting arm 12 and the clamp actuating lever 30. Some of this movement, with work in position, takes place in the lever 30 and some takes place in the saw supporting arm 12. The division of movement is controlled by the lateral extent or cross dimension, so to speak, of the work. Small movement of the arm 30 and clamp is accompanied by a large angular movement of the saw. Conversely, large movement of the lever 30 and the clamp is accompanied by a small angular movement of the saw. The extreme condition is where there is no work in position to be cut when all movement is transmitted to the lever 30 and the clamp and none to the saw. Of course, it is to be appreciated that the number of tubes which can be placed in the apparatus to be cut varies with the diameter of the individual tubes.

In order to provide clearance and working freedom at the front end of the table 2, the system involving the link or rod 50 and the levers 51 and 54 is provided in order to get the moving parts to the rear of the saw disc. This may introduce, in effect, a longer lever action on the movement of the clamp 55 than the length of the lever afforded by the saw supporting arm 12. To compensate for this, the reversing control 40 and 42 and related parts may be somewhat angularly disposed as shown, thus providing a longer arm from the fulcrum 13 to the point 41 than from the fulcrum 31 to the switch 46. In the arrangement shown, a differential of movement of the clamp 55 equal to the diameter of one tubing, imparts an equal differential of movement in the saw. In other words, if one tubing be removed from those shown in the drawing, the clamp is given a movement increased by the diameter of one tubing and the saw is given a movement decreased by the diameter of one tubing.

With this construction, a high rate of production may be accomplished in the sawing of work pieces to length. Inasmuch as there is no resistance to the movement of the arm 30 and the clamp 55, except that unavoidably encountered in friction involved in the mechanism, such movement is accomplished faster than the movement of the saw which must cut through the work. This is particularly true where compressed air is used as the elasticity of the air quickly swings the lever to the position where it is stopped when the clamp engages the work against the stops 10. The movement of the saw through the work is somewhat slower because of resistance. Thus the machine can perform efficiently, successively cutting, in different cycles, one or two tubes whereas it might have a capacity of 14 or 15 tubes or more.

As stated above, the mechanism of this invention may be employed for cutting work pieces of any kind of material which may be cut by a saw or other cutting instrument. It may be used for example in cutting wide planks of wood or narrow molding strips of wood, or other classes of work, some pieces of which may be relatively wide and some relatively narrow.

I claim:

1. An apparatus for cutting work comprising, a movable work positioning stop for engaging the work on one side, a cutting element movable into the work from said side, a movable clamp for engaging the work on the opposite side and for urging the work against said stop, power means, means interconnecting the power means with the cutting element and with the clamp for imparting driving force to both, control means for determining a given range of movement of the power means, the cutting element being arranged and constructed to offer more resistance to movement than the clamp, whereby it acts as a reaction element, so that upon actuation of the power means, the clamp moves to clamping position with the work urged against the stop during a portion of the range of movement of the power means, and thereafter the clamp acts as the reaction means for movement of the cutting element during the remainder of the range of movement of the power means.

2. An apparatus for cutting work comprising, a cutting element movable into the work from one side thereof, a movable clamp for clamping the work on the opposite side thereof, a stop against which said one side of the work is urged by the clamp for positioning the work in cutting position, power means, means interconnecting the power means with the cutting element and with the clamp for imparting driving force to both, means for limiting the power means to a determined range of movement, the cutting element being arranged and constructed to offer resistance to movement greater than that of the clamp, whereby, upon actuation of the power means, the clamp moves to clamp the work against said stop during a portion of the range of movement of the power means as determined by the size of the work, and thereafter, with the clamp stationary in clamped position, it serves as a reaction element for movement of the cutting element through the remainder of the said range of movement to cut the work.

3. An apparatus for cutting work comprising, a work positioning stop for engaging the work on one side, a cutting element movable into the work from said one side, a movable clamp for engaging the work on the opposite side and for urging the work against said stop, power means in the form of a cylinder with a piston therein, means interconnecting the piston and cylinder one with the clamp and one with the cutting element, means for determining the relative stroke of the cylinder and piston, the cutting element being arranged and constructed to offer resistance to movement greater than that of the clamp, means for introducing air under pressure into the cylinder, whereby the cutting element acts as a reaction element for movement of the clamp to clamping position during a portion of the stroke of movement as determined by the cross dimension of the work, and thereafter, while substantially stationary in clamping position, the clamp serves as a reaction element for movement of the cutting element during the remainder of the determined stroke of the cylinder and piston, to cut the work.

4. An apparatus for cutting work comprising, a support for the work, a first movable member for supporting a cutting element on one side of the work, a second movable member, a clamp for engaging the opposite side of the work, means interconnecting the second movable member and the clamp, a work positioning stop for engaging the work on the said one side, fluid operated power means including relatively movable elements, one of which is connected to one movable member and the other of which is connected to the other movable member, yieldable means acting on the first movable member to hold said member with the cutting element out of cutting position with respect to the work on said one side thereof, means for introducing fluid into said power means whereby the second movable member is shifted to move the clamp into clamping position with respect to said opposite side of the work and to clamp the work against said stop while the first movable member serves as a reaction element due to the action of the yieldable means, and thereafter the first movable member is moved with the second movable member substantially stationary with the clamp in clamping position and serving as the reaction element, for causing the cutting element to traverse and cut the work from said one side thereof, and means for limiting the relative movement of the two movable members and for reversing the application of fluid to the power means for shifting the two movable members back to starting position.

5. An apparatus for cutting work comprising, a support for the work, a pivotally mounted arm, a cutting element carried thereby and positioned to move into the work from one side thereof, a second pivotally mounted arm, a clamp for engaging the work on the opposite side thereof, means connecting the second arm with the clamp, a fluid motor including relative movable elements, one connected to the first arm and one connected to the second arm, a work positioning stop against which the said one side of the work is urged by the clamp, the two arms having a position of rest with the cutting element out of cutting position on said one side of the work and with the clamp out of clamping position on the opposite side of the work, yieldable means acting upon the first said arm tending to hold the same in its position of rest, means for introducing fluid to said motor so that the second named arm is shifted to move the clamp into clamping relationship with the work and with the work urged against said stop, such movement of the second named arm being determined by the size of the work, and so that the first named arm is thereafter moved to cause the cutting element to traverse and cut the work, and means for limiting the total relative movement of the two arms and for reversing the application of the fluid to the motor for shifting the two arms back to their position of rest, the extent of the movement of the first arm being that represented by the difference between the total relative movement and the movement of the second named arm.

6. An apparatus for cutting work comprising, a work positioning stop for engaging the work on one side thereof, a first movable member for supporting a cutting element, a second movable member, a clamp for engaging the opposite side of the work, means connecting the second movable member with the clamp, power means interconnecting the two movable members including two relatively movable elements, one connected to one member and one connected to the other member, the two movable members having a normal at rest position with the cutting element out of cutting position relative to the work on said one side thereof and with the clamp out of clamping position on the opposite side thereof, means for determining the total relative movement between the two movable members, the first movable member being biased against movement so that it offers more resistance to movement than the second movable member, means for energizing the power means to move the second movable member and thereby shift the clamp to clamp the work against the stop, the movement of the second movable member being that portion of the total movement as determined by the dimension of the work between the clamp and the stop, the first movable member being moved by the power means when the second movable member is substantially stationary with the clamp in clamping position and the movement thereof being the remainder of the total relative movement between the two members and such as to cause the cutting element to just substantially traverse the work to cut the same.

References Cited in the file of this patent

UNITED STATES PATENTS

| Number | Name | Date |
|---|---|---|
| 1,850,853 | Smith | Mar. 22, 1932 |
| 2,327,920 | Moohl | Aug. 24, 1943 |
| 2,389,934 | Rothenberg et al. | Nov. 27, 1945 |